(12) United States Patent
Wang et al.

(10) Patent No.: US 12,225,299 B2
(45) Date of Patent: Feb. 11, 2025

(54) SYSTEM AND METHOD FOR IMAGE BANDING DETECTION

(71) Applicant: ADVANCED MICRO DEVICES, INC., Santa Clara, CA (US)

(72) Inventors: Po-Min Wang, Hsinchu (TW); MuFan Yen, Hsinchu (TW)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/564,089

(22) Filed: Dec. 28, 2021

(65) Prior Publication Data

US 2023/0209210 A1  Jun. 29, 2023

(51) Int. Cl.
*H04N 23/745* (2023.01)
*G06T 7/00* (2017.01)
*H04N 23/73* (2023.01)
*H04N 23/90* (2023.01)

(52) U.S. Cl.
CPC ......... *H04N 23/745* (2023.01); *G06T 7/0002* (2013.01); *H04N 23/73* (2023.01); *H04N 23/90* (2023.01); *G06T 2207/10144* (2013.01); *G06T 2207/20224* (2013.01); *G06T 2207/30168* (2013.01)

(58) Field of Classification Search
None
See application file for complete search history.

(56) References Cited

U.S. PATENT DOCUMENTS

| | | | |
|---|---|---|---|
| 11,343,438 B1* | 5/2022 | Wang | H04N 5/2353 |
| 2009/0002520 A1* | 1/2009 | Yoshida | H04N 25/583 |
| | | | 348/226.1 |
| 2009/0021598 A1* | 1/2009 | McLean | G01J 3/447 |
| | | | 348/E5.022 |
| 2016/0227100 A1* | 8/2016 | Liu | H04N 5/23248 |
| 2018/0041681 A1* | 2/2018 | Pope | F21V 23/0464 |
| 2019/0370948 A1* | 12/2019 | Tico | H04N 5/2355 |

FOREIGN PATENT DOCUMENTS

| | | | | |
|---|---|---|---|---|
| CN | 106131543 B | * | 7/2018 | ......... H04N 5/2353 |
| CN | 110213497 A | * | 9/2019 | ......... H04N 5/2351 |
| CN | 110855901 A | * | 2/2020 | ......... H04N 5/2353 |
| WO | WO-2018047171 A1 | * | 3/2018 | ............. G01J 3/28 |

OTHER PUBLICATIONS

English translation of CN 110213497 A, Li, May 2019 (Year: 2019).*
English Translation of CN 106131543 B, Ariga, 2016 (Year: 2016).*
English translation of CN-110855901-A, Lin, Feb. 2020 (Year: 2020).*

* cited by examiner

*Primary Examiner* — James M Hannett

(57) ABSTRACT

A system for automatic image band detection includes concurrently capturing a first image of a scene with a first camera having a first exposure time and a second image of the scene with a second camera having a second exposure time. The system detects image banding for one of the first camera and the second camera based on the first image and the second image.

20 Claims, 4 Drawing Sheets

SYSTEM AND METHOD FOR IMAGE BANDING DETECTION

BACKGROUND

To enhance the user experience, many electronic devices include image capturing systems (e.g., cameras) to allow a user to capture and store images. However, the images captured by these systems often contain visual artifacts, including an artifact referred to as image banding, or flicker. Flicker results from unwanted image bands that arise from the differences between the electrical power frequency used for lighting in the environmental background of an image and the exposure time of the image capturing system. While techniques have been developed to detect and address flicker during image capture, these conventional techniques are relatively inflexible, and are tailored to a particular environmental power frequency, thus limiting the utility of the image capturing system.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-4 illustrate techniques for reducing or eliminating image banding, or flicker, in images captured by an image capturing device, such as a device that includes multiple cameras. In embodiments, the image capturing device captures multiple images of a scene, with each image captured using a different exposure time. A difference image is generated based on the difference between the captured images, and the difference image undergoes a frequency analysis to automatically detect flicker. Based on the flicker, the image capturing device sets the exposure time for the capture of subsequent images. By using multiple images captured at different exposure times, the image capturing device is able to detect and address image banding in a wide variety of environments having different environmental power frequencies, improving the quality of the captured images.

To illustrate, the environmental power frequencies differ considerably in different countries, with some countries using 50 Hz power and other countries using 60 Hz power. A mismatch between the environmental power frequency and the exposure time of an image capturing device typically results in image banding. Previously, capture devices relied on successively captured images to identify the image banding. However, significant differences between the images (e.g., due to camera panning or shaking, or images moving) or minimal changes between the images (e.g., because the camera is in a fixed position) often made it difficult to detect image banding. Using the techniques described herein, an image capturing device employs two cameras to concurrently capture multiple images, using different exposure times for each captured image. Because of the different exposure times, at least one of the capture images will be ensured to include image banding artifacts. This in turn ensures that the image banding is detected from a difference image based on the captured images. This allows the image capturing device to more reliably detect and address image banding in a wide variety of environments associated with different environmental power frequencies.

Figure 1:
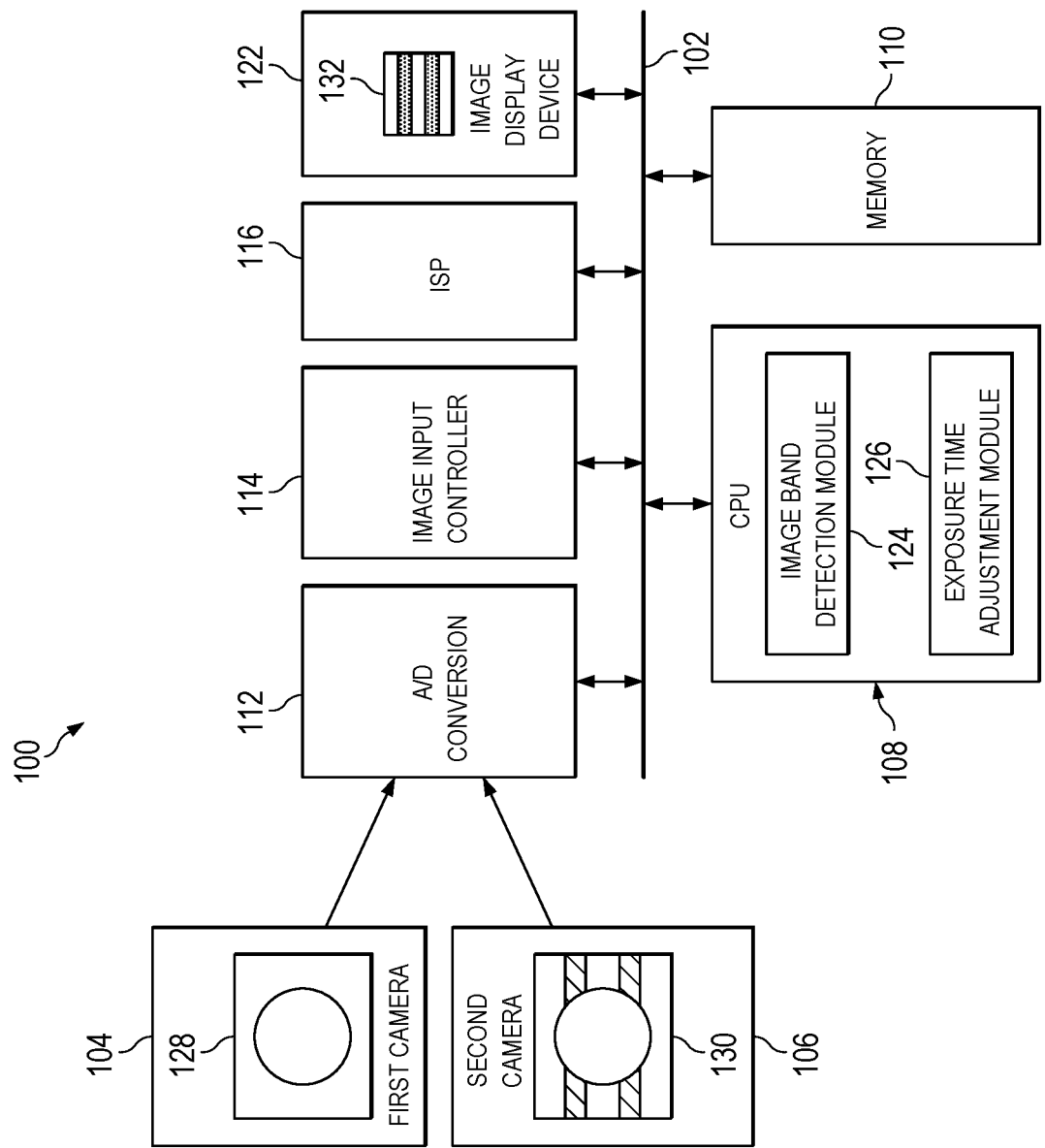
FIG. 1 is a block diagram of a multi-camera processing system that detects image banding and controls camera exposure times to reduce or eliminate such image banding in accordance with some embodiments.

FIG. 1 is a block diagram of an image capturing device 100 that supports image banding detection based on concurrent capture of multiple images in accordance with embodiments. The image capturing device 100 is configured to execute sets of instructions (e.g., computer programs or applications) to process images captured by and received from a first camera 104 and a second camera 106. In different embodiments the image capturing device 100 may be incorporated into one of a number of electronic devices, such as a smartphone, laptop computer, monitor, tablet, game console, digital single-lens reflex (DSLR) camera, AR/VR headset or any other device that captures images.

In order to execute the sets of instructions, the device includes a central processing unit (CPU) 108, a memory 110 such as a dynamic random access memory (DRAM) or other types of memory including static random access memory (SRAM), nonvolatile RAM, flash and the like. The device 100 includes a bus 102 to support communication between the interoperating entities implemented in the device 100, such as the memory 110, an analog-to-digital converter 112 which is electronically coupled to the first camera 104 and the second camera 106, an image input controller 114, an image signal processor 116, and an image display device 122 such as a light-emitting diode (LED) display, liquid crystal display (LCD) display, organic LED (OLED) display, etc.

In embodiments, the central processing unit (CPU) 108 controls operation of the device 100 and executes the set of instructions that implement an automatic image band detection module 124 as well as instructions to automatically adjust camera exposure time using an exposure time adjustment module 126 to reduce or eliminate the effects of image banding on the images captured by each of the cameras 104, 106. In embodiments, the image band detection module 124, executed in conjunction with an image signal processor 116, operates upon difference images generated from images captured from cameras provided with the device 100 to detect the presence of visual image bands in the captured images. In particular, the image band detection module 124 is generally configured to identify image bands in images (images 128 and 130) captured by the cameras 104 and 106 by determining the difference between the captured images. Each image 128 and 130 is captured at a different exposure time, and each exposure time is based on a different power frequency (e.g., 60 Hz and 50 Hz). Thus, one of the images 128 and 130 is captured with an exposure time that is mismatched with the local power frequency, and this image will therefore reflect image flicker. The image band detection module 124 determines the difference between the captured images and represents the determined difference as a difference image. In at least some embodiments, the difference image is a set of values representing the difference in pixel values for corresponding pixels of the captured image.

The image signal processor 116 generates a frequency profile based on the difference image, wherein the frequency profile indicates a frequency associated with the image banding in at least one of the captured images. In at least some embodiments, the frequency of the image banding is based on (e.g., is an integer multiple of) the power frequency that caused flicker in one of the captured images 128 and 130. The frequency profile thus indicates which of the images 128 and 130 did not cause flicker, and therefore which exposure time is most compatible with the local power frequency. The exposure time adjustment module 126 is configured to adjust camera exposure times, based on the frequency profile, to reduce or eliminate the presence of bands in captured images.

In embodiments, the memory 110 stores the programs executed by the CPU 108 and various data needed for control. In embodiments, the memory 108 is used as a working area for the CPU 108 and as a temporary storage area of image data. In embodiments, the memory 110 includes RAM that is used as a temporary storage area of image data for displaying. In embodiments, the memory 110 also includes various configuration information and the like unique to a user.

In embodiments, the analog-to-digital converter 112 produces an output by converting the analog image signals received from each of the cameras 104, 106 into a digital image signal. In embodiments, the image input controller 114 incorporates a line buffer of a predetermined capacity which captures an image signal for each frame output from the analog-to-digital converter 112 and stores each frame in the memory 110 under the control of the CPU 108. In embodiments, the image signal processor 116 receives the image data from the memory 110 and performs the necessary signal processing to generate an image signal from a luminance signal (Y) and color-difference signals (Cr, Cb) under the control of the CPU 108.

FIG. 2 is a diagram illustrating how image banding results from a mismatch between exposure times and local power frequency. FIG. 2A is an illustration of a waveform depicting the exposure times for each camera 104, 106 in the device 100 for cameras with rolling shutter image sensors. In embodiments, each camera 104, 106 used in the device 100 includes a complementary metal oxide semiconductor (CMOS) imaging sensor for use in capturing images. Such cameras include multiple rows of CMOS sensors where each row includes a discrete number of sensors for use in capturing images. As each row of sensors is exposed in a staggered sequential manner according to a given exposure time, a light signal is read, converted and a partial image is generated. A complete image is generated once each row of sensors in a camera has been exposed to the light signal. This staggered sequentially timed exposure process for camera 104 is represented by the waveform in FIG. 2A. The lines in the first half period of the waveform 201 represent a first exposure time for a row of sensors for the camera 104. The second half period of the waveform 201 represents a second exposure time for the succeeding row of sensors for the camera 104. The waveform is an abstraction representing a continuous imaging process performed by the camera 104 and would therefore continue beyond an initial period until all CMOS sensors in each row of the camera read a signal, convert the signal and generate a partial image from each converted signal. In this illustration, the exposure times are the same as the environmental power frequency and the camera in this illustrative example does not produce an image 203 with image bands (as shown in FIG. 2B).

Figure 2A:
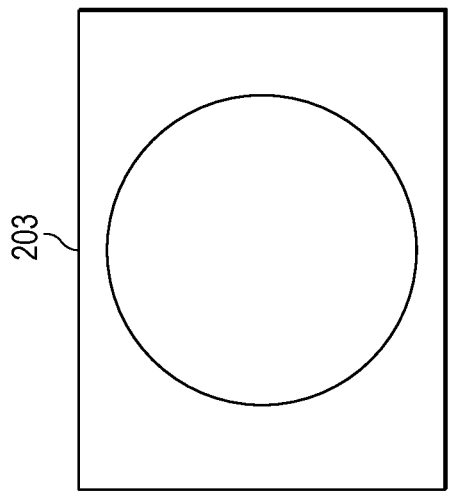
FIG. 2A is an illustration of a sinusoidal signal representing relative exposure times at the multi-camera processing system of FIG. 1, in which no image banding is present in accordance with some embodiments.
Figure 2B:
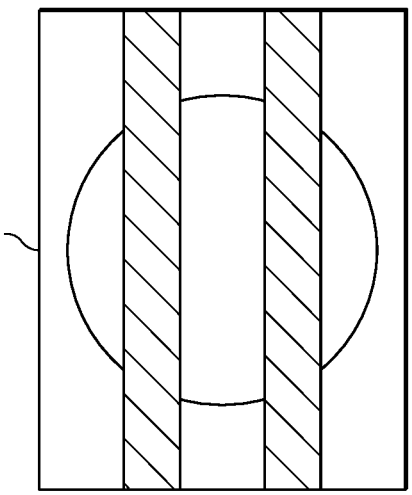
FIG. 2B is a representation of a camera image produced from a dual-camera processing system in which no image banding is present in accordance with some embodiments.
Figure 2C:
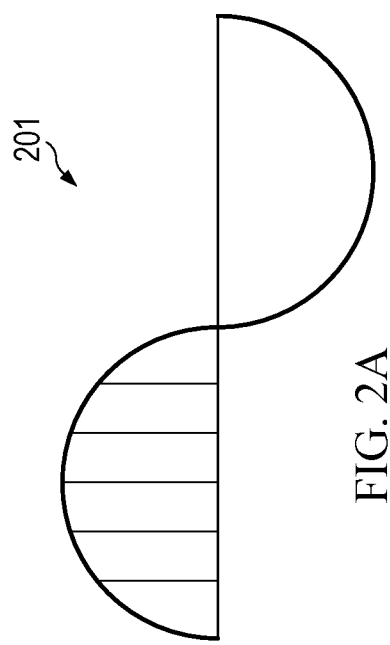
FIG. 2C is an illustration of a sinusoidal signal representing relative exposure times of cameras in a dual-camera processing system in which image banding is present in accordance with some embodiments.
Figure 2D:
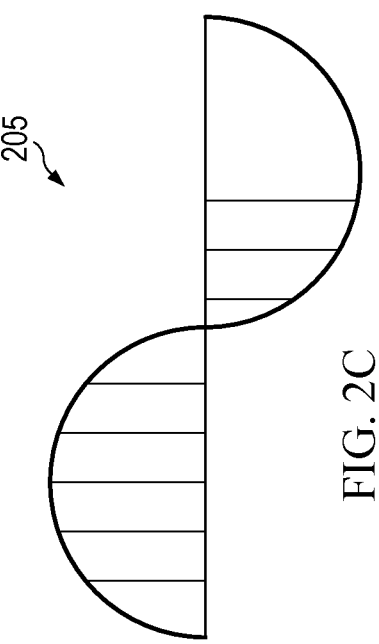
FIG. 2D is a representation of a camera image produced from a dual-camera processing system when image banding is present in accordance with some embodiments.

Alternatively, FIG. 2C depicts a waveform 205 in which the exposure time of a camera is different than the environmental power frequency. Accordingly, the image 207 from the camera is generated with multiple image bands as is depicted in FIG. 2D. More generally, image banding can be produced from differences between the operating frequency of a camera and the environmental power frequency used for lighting of a scene depicted in an image. In such situations, image banding occurs in images where the difference in operating frequency of a camera (i.e., based on its exposure time) and the background lighting of a scene is sufficiently large, such as when the camera frequency is 50 Hz and an environmental background frequency is 60 Hz. Such differences may also arise when a camera exposure time is 60 Hz and the environmental power frequency is 50 Hz. Although two bands are shown in FIG. 2D, it is to be understood by those skilled in the art that more than two image bands may be present in an image of a scene where such differences exist. This illustration is based on the use of cameras that function as previously described with several rows of vertically stacked CMOS sensors where each row is exposed in a stagged sequential manner.

Figure 3:
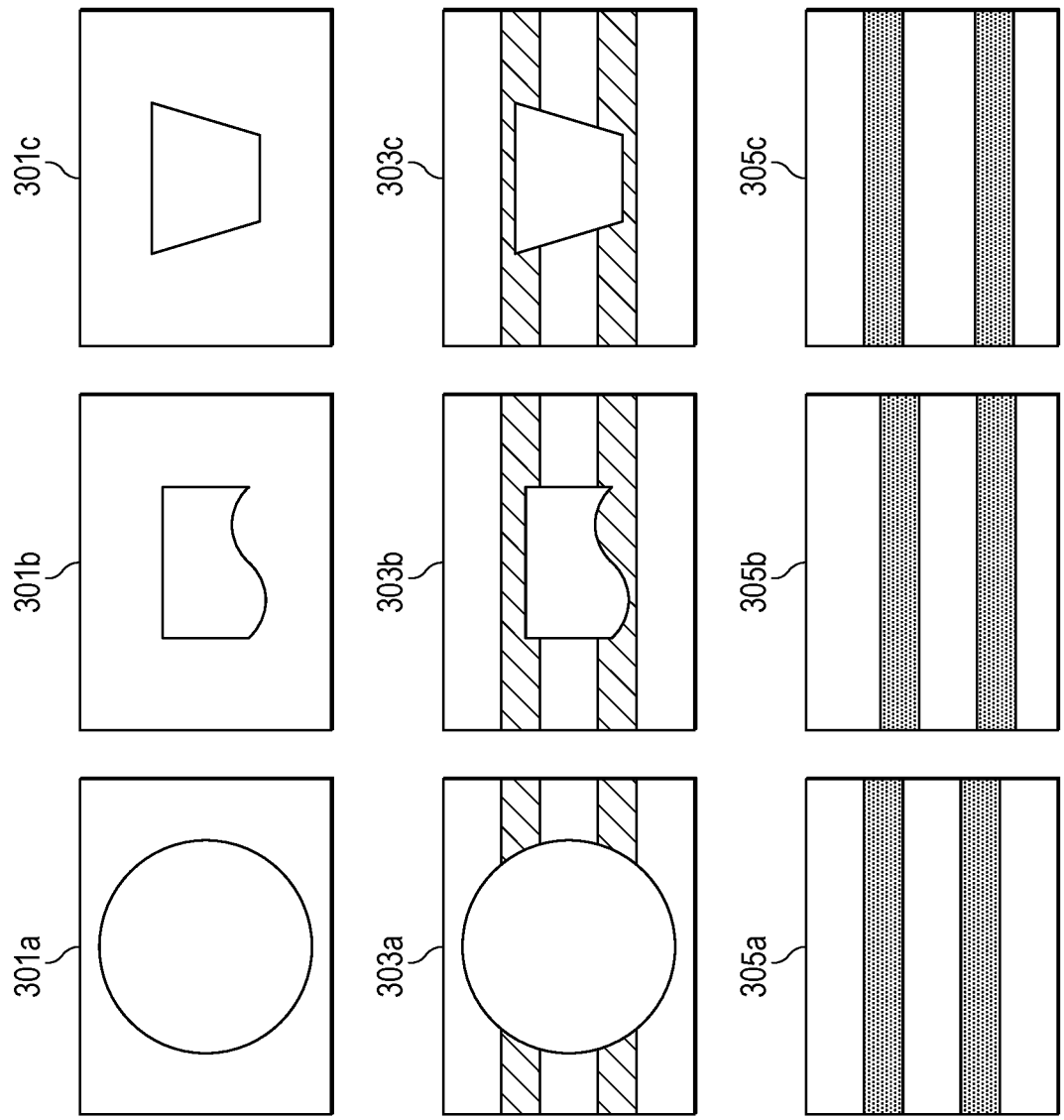
FIG. 3 is a representation of images from each camera in a dual-camera processing system and an illustration of a banding image produced from each pair of camera images in accordance with some embodiments.

FIG. 3 is a representative illustration of three images from the first camera 104 and three images from the second camera 106 according to embodiments. In this example, the three sets of images were taken concurrently by cameras 104 and 105. As discussed further herein, the images from a respective set are visibly different images due to image banding. In this example, the images from the first camera 104 are shown as image 301a, image 301b, and image 301c. These images show no image banding and therefore appear to be from a camera with an exposure time that is equal to the environmental power frequency used for lighting. The images from the second camera 106 are shown as image 303a, image 303b and image 303c, which images were taken concurrently with the counterpart images from the first camera 104, which are shown as image 301a, image 301b, and image 301c. The images from the second camera 106 show visible image banding and therefore indicate that the operating frequency of the second camera 106 differs from the environmental power frequency used for lighting.

Continuing with FIG. 3, a difference image determined from the corresponding pairs of images from the two cameras is shown on the third row as images 305a, 305b and 305c. The difference images provide the system with the information required to enable the image bands to be readily detected and to adjust the exposure times of at least one of the camera in order to achieve a lower degree of image banding according to an embodiment. For example, the banding regions of difference image 305a represent areas of significant difference between image 301a and 303a. Since images 301a and 303a were taken concurrently by similarly situated cameras, one would expect the images to be the same. Thus, the banding areas represent areas of image banding. In embodiments, the device 100 automatically detects the presence of such image bands and dynamically adjusts the exposure times of the camera that introduces banding.

In embodiments, the image banding is detected based on a comparison of image data using a correlation test that determines the degree of similarity between the difference image and the captured images. The test is implemented using a pre-determined threshold based on a percentage of matching pixel values between a difference image and each camera generated image. In some embodiments, the test is performed by comparing the difference image and the image from the first camera 104 and by comparing the difference image and the image from the second camera 106. Based on this analysis, the camera having the higher similarity value is determined to have one or more image bands. For example, if the comparison between the difference image and the first camera 104 image has a higher similarity value than a comparison between the difference image and the second camera 106, and the first camera 104 has a 60 Hz exposure time, the CPU 104 determines that the environment light frequency is 50 Hz and sets the exposure time of the first camera 104 to 50 Hz in order to reduce or eliminate the image bands. Likewise, if the comparison between the difference image and the second camera 106 has a higher similarity value than a comparison between the difference image and the first camera 106, and if the second camera 106 has an exposure time of 50 Hz, then the CPU 104 determines that the environment light frequency is 60 Hz and sets the exposure time of the second camera 106 to 60 Hz to reduce or eliminate the image bands.

Figure 4:
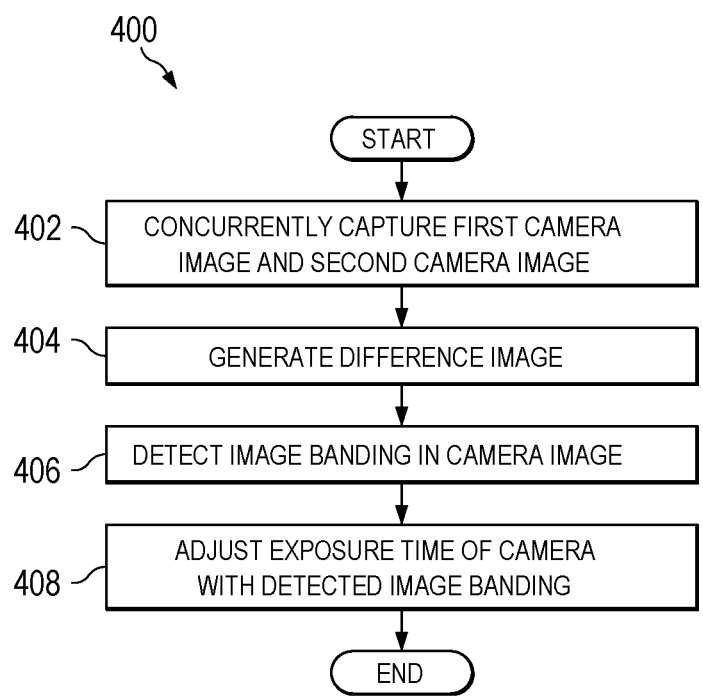
FIG. 4 is a flowchart illustrating a method for automatically adjusting image banding in accordance with some embodiments.

FIG. 4 is a flow chart illustrating a method 400 for controlling image banding in an embodiment. At Block 402, the device 100 concurrently captures a first image from the first camera 104 and a second image from the second camera 106. Concurrent capturing of images enables the difference image to be readily generated for each pair of captured images from the two cameras and this difference image is used to control a separate process for reducing or eliminating any banding that may occur in the images. It is worth noting that concurrent as used in the specification does not require exact capture timing. One skilled in the art will recognize that images captured close enough in time and that are capable of being used to detect banding are sufficiently concurrent for purposes of the invention.

At Block 404, a difference image is generated from a subtractive difference in pixel values for each image of a scene received from the first camera 104 and each corresponding image of the same scene received from the second camera 106. At Block 406, image banding is detected based on the difference image, such as by generating a frequency spectrum of the difference image, and identifying a correlation between the frequency spectrum and the exposure time for one of the two captured images. If image banding is detected, the camera exposure time is adjusted for the camera that captured the banded image, as shown at Block 408, to reduce or eliminate the presence of bands in the images produced by the camera with an exposure time that differs from the environmental power frequency. The adjusting of camera exposure time entails either a manual or automatic adjustment of a camera's image exposure time to be as close to the environmental power frequency as possible.

In determining the presence of image banding and in calculating the adjustments required to remove or reduce such banding, certain quantitative ratios are determined. In embodiments, the exposure time of the first camera relative to the environmental power frequency of the scene captured in a camera image as well as the exposure time of the second camera relative to the environmental power frequency are determined and compared. Automatic adjustments are applied to the exposure times of the camera whose images include banding. Hence, where a comparison between the exposure time of a camera and environment light frequency reveals an exact or close match and a comparison of a different camera's exposure time relative to the environmental power frequency used for lighting reveals a significant difference, then the presence of image banding is determined to have been detected and the device 100 applies an automatic adjustment of the exposure time to achieve a match to the environmental power frequency used for lighting to reduce the presence of image banding. This adjustment by the device 100 is achieved by heuristically controlling the photographic shutter speed of the affected camera to moderate or reduce the effect of image banding.

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
concurrently capturing a first image of a scene with a first camera having a first exposure time and a second image of the scene with a second camera having a second exposure time, wherein the first exposure time and the second exposure time are different; and
detecting image banding for one of the first camera and the second camera based on comparing the first image and the second image to a subtractive difference between pixels of the first image and second image, wherein image banding is detected for the first camera based on the first image having a higher similarity to the subtractive difference than the second image.

2. The method of claim 1, wherein the detecting of image banding is performed using a difference image, wherein the difference image is based on the subtractive difference that is determined between each of a plurality pixels of the first image and each of a plurality of pixels of the second image.

3. The method of claim 2, wherein the detecting of image banding is determined from a difference between a frequency related to a camera exposure time and an environment power frequency of the scene.

4. The method of claim 3, wherein the detecting of image banding in the first image is determined when the frequency related to the first exposure time differs from the environment power frequency of the scene.

5. The method of claim 3, wherein the detecting of image banding in the second image is determined when the frequency related to the second exposure time differs from the environment power frequency of the scene.

6. The method of claim 3, wherein the difference between the frequency is performed on a plurality of difference images, each difference image in the plurality of difference images determined from a subtractive difference between each image in a plurality of first images from the first camera and each image in a plurality of second images from the second camera.

7. The method of claim 1, further comprising:
controlling at least one of the first exposure time or the second exposure time based on the detected image banding.

8. The method of claim 7, further comprising:
reducing image banding in subsequent images captured by the first camera or the second camera by controlling at least one of the first exposure time or the second exposure time.

9. The method of claim 1, wherein the first exposure time or the second exposure time is based on a fraction of an environment power frequency of 50 Hz, and wherein the other one of the first exposure time and the second exposure time is based on a fraction of an environment power frequency of 60 Hz.

10. The method of claim 1, wherein image banding is detected for the second camera based on the second image having a higher similarity to the subtractive difference than the first image.

11. A device, comprising:
a first camera configured to capture a first image of a scene, the first image captured using a first exposure time, and a second camera configured to concurrently capture a second image of the scene, the second image captured using a second exposure time different from the first exposure time;
a memory configured to store the first image and the second image received from each of the first camera and the second camera; and
a processor communicatively coupled to the memory, the processor configured to:
detect image banding for one of the first camera and the second camera based on comparing the first image and the second image to a subtractive difference between pixels of the first image and second image, wherein image banding is detected for the first camera based on the first image having a higher similarity to the subtractive difference than the second image.

12. The device of claim 11, wherein the processor is configured to detect image banding using a difference image, wherein the difference image is based on the subtractive difference that is determined between each of a plurality pixels comprising the first image and each of a plurality of pixels comprising the second image.

13. The device of claim 12, wherein the processor is configured to detect image banding from a frequency analysis of the difference image.

14. The device of claim 13, wherein the processor is configured to detect image banding from a highest similarity value, the highest similarity value determined from a first image comparison and a second image comparison, the first image comparison comparing the frequency analysis of the difference image and the first image captured with the first camera, the second image comparison comparing the frequency analysis of the difference image and the second image captured with the second camera.

15. The device of claim 13, wherein the processor is configured to perform the frequency analysis on a plurality of difference images, each difference image in the plurality of difference images determined from a subtractive difference between each image in a plurality of first images from the first camera and each image in a plurality of second images from the second camera.

16. The device of claim 11, wherein the processor is configured to control at least one of the first exposure time or the second exposure time based on the detected image banding.

17. The device of claim 16, wherein the processor is configured to reduce image banding in subsequent images captured by the first camera or the second camera by controlling at least one of the first exposure time or the second exposure time.

18. The device of claim 13, wherein the frequency analysis is a power spectrum frequency analysis of the difference image.

19. The device of claim 13, wherein the processor is configured to detect image banding in the second image from the frequency analysis when a frequency related to the second exposure time differs from an environment power frequency of the scene.

20. A non-transitory computer readable medium having software instructions stored thereon that, when executed by a processor, cause the processor to:
detect image banding for one of a first image captured by a first camera and a second image concurrently captured by a second camera based on comparing the first image and the second image to a subtractive difference between pixels of the first image and second image, wherein image banding is detected for the first camera based on the first image having a higher similarity to the subtractive difference than the second image, wherein the first image is captured by the first camera having a first exposure time and the second image is captured by the second camera having a second exposure time different from the first exposure time.

\* \* \* \* \*